United States Patent
Kagawa

(10) Patent No.: US 8,768,597 B2
(45) Date of Patent: Jul. 1, 2014

(54) VEHICLE CONTROL DEVICE, VEHICLE CONTROL METHOD, AND VEHICLE CONTROL SYSTEM

(75) Inventor: Kazunori Kagawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 75 days.

(21) Appl. No.: 13/387,288

(22) PCT Filed: Jul. 28, 2009

(86) PCT No.: PCT/JP2009/063424
§ 371 (c)(1),
(2), (4) Date: Jan. 26, 2012

(87) PCT Pub. No.: WO2011/013201
PCT Pub. Date: Feb. 3, 2011

(65) Prior Publication Data
US 2012/0123658 A1    May 17, 2012

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC .......... 701/96; 701/23; 701/36; 701/93; 701/117; 701/119

(58) Field of Classification Search
USPC .......... 701/1, 2, 23, 24, 36, 93, 96, 117, 118, 701/119, 400, 300, 301, 302; 180/170
See application file for complete search history.

(56) References Cited

U.S. PATENT DOCUMENTS

| 7,206,686 B2 * | 4/2007 | Sawamoto et al. | 701/96 |
| 8,185,300 B2 * | 5/2012 | Miura et al. | 701/516 |
| 2002/0059017 A1 * | 5/2002 | Yamane et al. | 701/1 |

FOREIGN PATENT DOCUMENTS

| JP | 11-222050 A | 8/1999 |
| JP | 2002 123894 | 4/2002 |
| JP | 2008-90587 A | 4/2008 |
| JP | 2008 222123 | 9/2008 |
| JP | 2008-225815 A | 9/2008 |

OTHER PUBLICATIONS

International Preliminary Report on Patentability and Written Opinion issued Feb. 16, 2012 in PCT/JP2009/063424.
International Search Report Issued Aug. 25, 2009 in PCT/JP09/63424 Filed Jul. 28, 2009.

* cited by examiner

*Primary Examiner* — Rami Khatib
(74) *Attorney, Agent, or Firm* — Oblon, Spivak, McClelland, Maier & Neustadt, L.L.P.

(57) ABSTRACT

A navigation system acquired information relating to a point, such as a sag where a decrease in vehicle speed is induced in front of a system-mounted vehicle. When the system-mounted vehicle has reached a predetermined distance from the sag concerning the information acquired by the navigation system or when a predetermined time has come before reaching the sag, an ECU and an ACC controls the traveling of the system-mounted vehicle such that the inter-vehicle distance from an ordinary vehicle behind the system-mounted vehicle increases. Therefore, even when a vehicle control device is not mounted in an ordinary vehicle behind the system-mounted vehicle, it becomes possible to prevent a decrease in the speed of the ordinary vehicle behind the system-mounted vehicle, thereby more effectively suppressing congestion.

9 Claims, 7 Drawing Sheets

VEHICLE CONTROL DEVICE, VEHICLE CONTROL METHOD, AND VEHICLE CONTROL SYSTEM

TECHNICAL FIELD

The present invention relates to a vehicle control device, a vehicle control method, and a vehicle control system. In particular, the present invention relates to a vehicle control device, a vehicle control method, and a vehicle control system for improving traffic flow on a road.

BACKGROUND ART

In the related art, there are attempts to control the traveling of an individual vehicle to improve traffic flow on a road and to reduce congestion. For example, Patent Literature 1 describes a congestion prevention device which, for the sake of preventing the occurrence of congestion before happens, acquires information indicating that a congestion factor is present on a road on which an host vehicle travels, acquires information indicating the operation of the host vehicle, determines whether or not the operation of the host vehicle is an operation which induces congestion corresponding to the congestion factor, and, when the operation of the host vehicle is an operation which induces congestion, performs driving support for suppressing the occurrence of congestion.

CITATION LIST

Patent Literature

[Patent Literature 1] Japanese Unexamined Patent Application Publication No. 2008-222123

SUMMARY OF INVENTION

Technical Problem

However, in the above-described technique, it is disadvantageous in that it is possible to cope with only a case where a factor which induces congestion resides in a vehicle in which the congestion prevention device is mounted, and when there is a high percentage of vehicles in which the congestion prevention device is not mounted, it becomes less effective in suppressing the occurrence of congestion.

The invention has been finalized in consideration of the above-described situation, and an object of the invention is to provide a vehicle control device, a vehicle control method, and a vehicle control system capable of more effectively suppressing congestion.

Solution to Problem

A vehicle control device of the invention includes information acquisition means for acquiring information relating to a vehicle speed decreasing point where a decrease in vehicle speed is induced in front of a host vehicle, and traveling control means for, at least one of when the host vehicle has reached a predetermined distance from the vehicle speed decreasing point concerning the information acquired by the information acquisition means and when a predetermined time has come before the host vehicle reaches the vehicle speed decreasing point concerning the information acquired by the information acquisition means, controlling the traveling of the host vehicle such that the inter-vehicle distance from another vehicle behind the host vehicle increases.

With this configuration, the information acquisition means acquires the information relating to the vehicle speed decreasing point where a decrease in vehicle speed is induced in front of the host vehicle. At least one of when the host vehicle has reached a predetermined distance from the vehicle speed decreasing point concerning the information acquired by the information acquisition means and when a predetermined time has come before the host vehicle reaches the vehicle speed decreasing point concerning the information acquired by the information acquisition means, the traveling control means controls the traveling of the host vehicle such that the inter-vehicle distance from another vehicle behind the host vehicle increases. Therefore, even when the device of the invention is not mounted in another vehicle behind the host vehicle, the inter-vehicle distance increases, thereby preventing a decrease in speed of another vehicle behind the host vehicle and more effectively suppressing congestion.

In this case, it is preferable that the traveling control means controls the traveling of the host vehicle such that the inter-vehicle distance from another vehicle behind the host vehicle increases in synchronization with the traveling of another vehicle which travels in a lane adjacent to the lane in which the host vehicle travels such that the inter-vehicle distance from a further vehicle behind another vehicle increases.

With this configuration, the traveling control means controls the traveling of the host vehicle such that the inter-vehicle distance from another vehicle behind the host vehicle increases in synchronization with the traveling of another vehicle which travels in a lane adjacent to the lane in which the host vehicle travels such that the inter-vehicle distance from a further vehicle behind another vehicle increases. Therefore, it is possible to prevent cutting-in which is likely to be induced when an appropriate inter-vehicle distance is given, and to suppress the occurrence of congestion due to the cutting-in.

It is preferable that the traveling control means estimates a vehicle having a vehicle speed decrease tendency which is another vehicle for which the possibility of a decrease in vehicle speed is equal to or greater than a predetermined threshold value, and at least one of when the vehicle having a vehicle speed decrease tendency has reached a predetermined distance before the vehicle speed decreasing point and when a predetermined time has come before reaching the vehicle speed decreasing point, controls the traveling of the host vehicle such that the host vehicle travels in parallel with the vehicle having a vehicle speed decrease tendency.

With this configuration, until a vehicle for which the possibility of a decrease in vehicle speed comes close to the vehicle speed decreasing point, the traveling control means controls the traveling of the host vehicle such that the host vehicle travels in parallel with the vehicle having a vehicle speed decrease tendency. Therefore, a driver of a vehicle having a vehicle speed decrease tendency which is likely to decrease in vehicle speed is given the illusion of its vehicle speed being low, thereby preventing a decrease in the vehicle speed of the vehicle having a vehicle speed decrease tendency and efficiently suppressing the occurrence of congestion due to a decrease in the vehicle speed of the vehicle having a vehicle speed decrease tendency.

In this case, it is preferable that, when it is detected that the vehicle having a vehicle speed decrease tendency has decreased in speed within a predetermined range from the vehicle speed decreasing point, the traveling control means controls the traveling of the host vehicle such that the host vehicle travels through a position where another vehicle can be prevented from cutting in front of the vehicle having a vehicle speed decrease tendency.

With this configuration, when it is detected that the vehicle having a vehicle speed decrease tendency has decreased in speed within a predetermined range from the vehicle speed decreasing point, the traveling control means controls the traveling of the host vehicle such that the host vehicle travels through a position where another vehicle can be prevented from cutting in front of the vehicle having a vehicle speed decrease tendency. Therefore, it is possible to prevent a further decrease in vehicle speed at the vehicle speed decreasing point due to the cutting-in of another vehicle in front of the vehicle having a vehicle speed decrease tendency having decreased in speed, thereby more efficiently suppressing the occurrence of congestion due to a decrease in the vehicle speed of the vehicle having a vehicle speed decrease tendency.

A vehicle control method according to the invention includes a step of acquiring information relating to a vehicle speed decreasing point where a decrease in vehicle speed is induced in front of a host vehicle, and at least one of when the host vehicle has reached a predetermined distance before the vehicle speed decreasing point concerning the information acquired in the step of acquiring the information and when a predetermined time has come before the host vehicle reaches the vehicle speed decreasing point concerning the information acquired in the step of acquiring the information, a step of controlling the traveling of the host vehicle such that the inter-vehicle distance from another vehicle behind the host vehicle increases.

In this case, it is preferable that, in the step of controlling the traveling of the host vehicle, the traveling of the host vehicle is controlled such that the inter-vehicle distance from another vehicle behind the host vehicle increases in synchronization with the traveling of another vehicle which travels in a lane adjacent to the lane in which the host vehicle travels such that the inter-vehicle distance from a further vehicle behind another vehicle increases.

It is preferable that, in the step of controlling the traveling of the host vehicle, a vehicle having a vehicle speed decrease tendency which is another vehicle for which the possibility of a decrease in vehicle speed is equal to or greater than a predetermined threshold value is estimated, and at least one of when the vehicle having a vehicle speed decrease tendency has reached a predetermined distance before the vehicle speed decreasing point and when a predetermined time has come before reaching the vehicle speed decreasing point, the traveling of the host vehicle is controlled such that the host vehicle travels in parallel with the vehicle having a vehicle speed decrease tendency.

In this case, it is preferable that, in the step of controlling the traveling of the host vehicle, when it is detected that the vehicle having a vehicle speed decrease tendency has decreased in speed within a predetermined range from the vehicle speed decreasing point, the traveling of the host vehicle is controlled such that the host vehicle travels through a position where another vehicle can be prevented from cutting in front of the vehicle having a vehicle speed decrease tendency.

A vehicle control system according to the invention includes information acquisition means for acquiring information relating to a vehicle speed decreasing point where a decrease in vehicle speed is induced, and traveling control means for, at least one of when one vehicle has reached a predetermined distance before the vehicle speed decreasing point concerning the information acquired by the information acquisition means and when a predetermined time has come before the one vehicle reaches the vehicle speed decreasing point concerning the information acquired by the information acquisition means, controlling the traveling of the one vehicle such that the inter-vehicle distance from another vehicle behind the one vehicle increases.

In this case, it is preferable that the traveling control means controls the traveling of the host vehicle such that the inter-vehicle distance from another vehicle behind the host vehicle increases in synchronization with the traveling of another vehicle which travels in a lane adjacent to the lane in which the host vehicle travels such that the inter-vehicle distance from a further vehicle behind another vehicle increases.

It is preferable that the traveling control means estimates a vehicle having a vehicle speed decrease tendency which is a vehicle for which the possibility of a decrease in vehicle speed is equal to or greater than a predetermined threshold value, and at least one of when the vehicle having a vehicle speed decrease tendency has reached a predetermined distance before the vehicle speed decreasing point and when a predetermined time has come before reaching the vehicle speed decreasing point, controls the traveling of the one vehicle such that the one vehicle travels in parallel with the vehicle having a vehicle speed decrease tendency.

In this case, it is preferable that, when it is detected that the vehicle having a vehicle speed decrease tendency has decreased in speed within a predetermined range from the vehicle speed decreasing point, the traveling control means controls the traveling of the one vehicle such that the one vehicle travels through a position where another vehicle can be prevented from cutting in front of the vehicle having a vehicle speed decrease tendency.

Advantageous Effects of Invention

According to the vehicle control device, the vehicle control method, and the vehicle control system of the invention, it becomes possible to more effectively suppress congestion.

DESCRIPTION OF EMBODIMENTS

Figure 1:
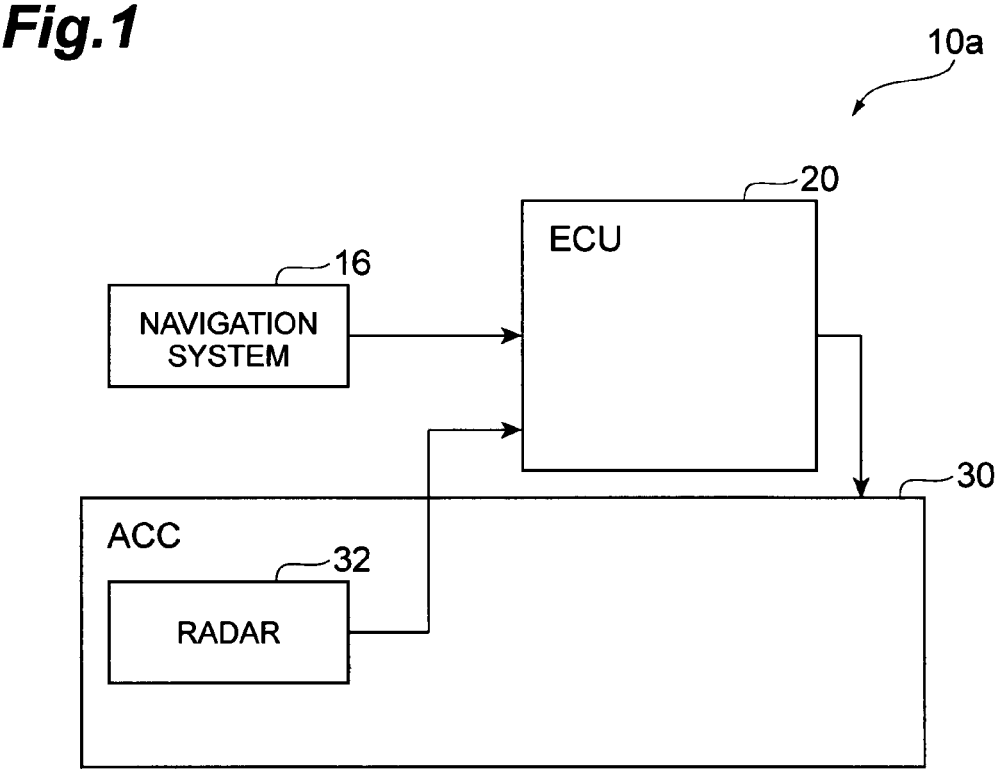
FIG. 1 is a block diagram showing the configuration of a traveling control device according to a first embodiment.

Hereinafter, a vehicle control device according to a first embodiment of the invention will be described with reference to the drawings. The vehicle control device of this embodiment is mounted in a vehicle, and performs vehicle control so as to improve traffic flow on a road. As shown in FIG. 1, a vehicle control device 10a of this embodiment includes a navigation system 16, an ECU (Electronic Control Unit) 20, and an ACC (Adaptive Cruise Control) 30.

The navigation system 16 includes a GPS which receives signals from a plurality of GPS (Global Positioning System) satellites by a GPS receiver and measures the position of a host vehicle from the difference between the signals, and a map information DB (Data Base) which stores map information in the host vehicle. The navigation system 16 performs a route guidance of the host vehicle, and also acquires information relating to a point, such as a sag (a change point from downhill to uphill on a road) in front of the host vehicle, where a decrease in vehicle speed is induced. For example, the navigation system 16 detects the relative position of the host vehicle with respect to the sag and outputs the result to the ECU 20.

The ECU 20 receives information relating to the relative position of the host vehicle with respect to the sag from the navigation system 16 and information relating to the relative position and relative speed of another vehicle around the host vehicle from a radar 32 of the ACC 30 as input. The ECU outputs traveling control command values, such as a target vehicle speed, an acceleration and deceleration and a target inter-vehicle distance to the ACC 30 on the basis of information input from the navigation system 16 and the ACC 30.

The ACC 30 has a radar 32 which detects the relative position and relative speed of each of other vehicles around the host vehicle. The ACC 30 performs traveling control such that the host vehicle reaches the target vehicle speed, the acceleration and deceleration and the target inter-vehicle distance on the basis of the traveling control command values from the ECU 20.

Figure 7:
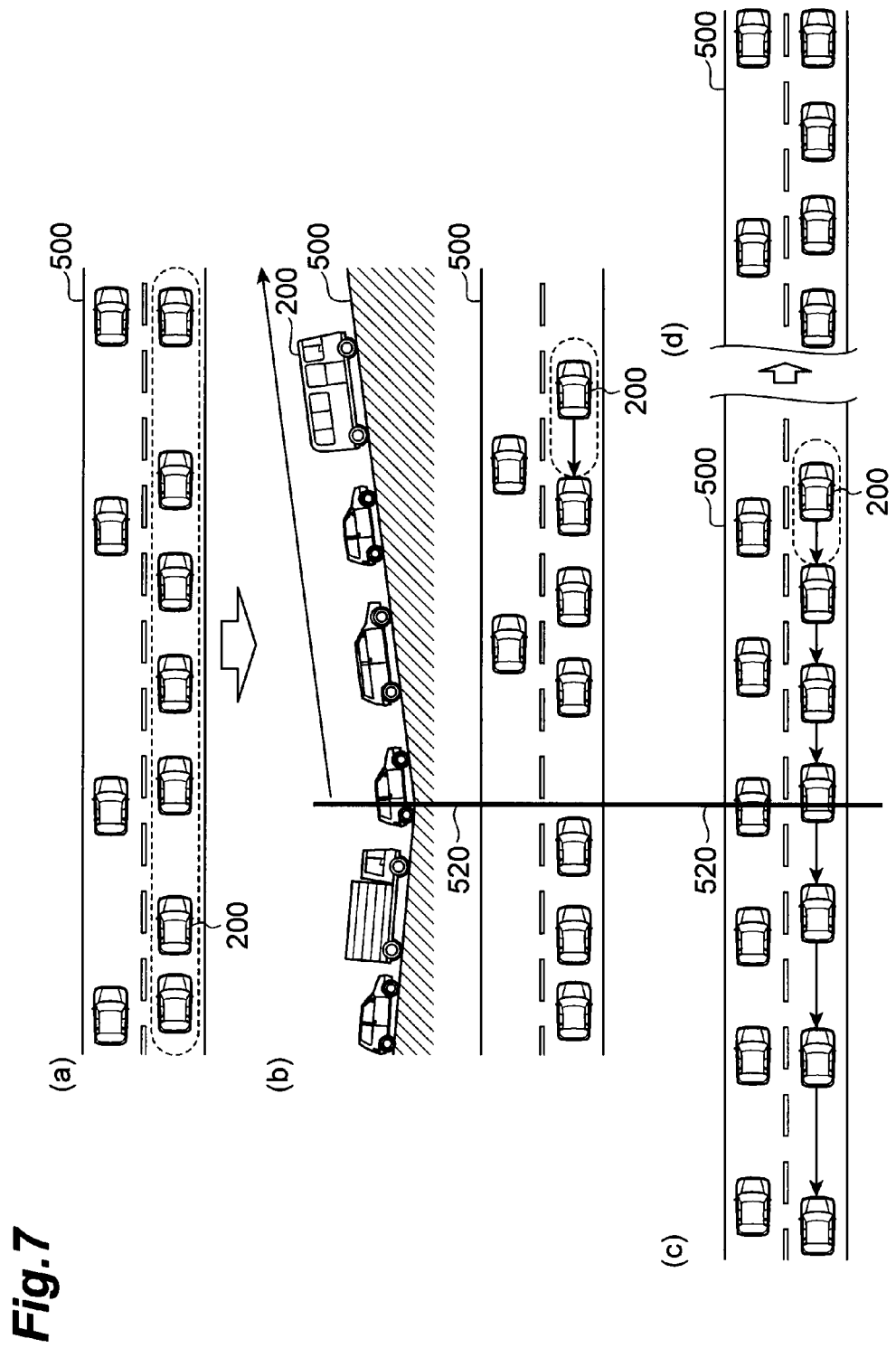
FIGS. 7(a) to 7(c) are diagrams showing a process in which congestion occurs in the vicinity of a sag.

Hereinafter, the operation of the vehicle control device 10a of this embodiment will be described. First, as a premise, a reason for congestion occurring at a sag or the like will be described. As shown in FIG. 7(*a*), it is assumed that ordinary vehicles 200 in which the vehicle control device 10a of this embodiment is not mounted are traveling on a road 500 in column. Traffic flow increases, the inter-vehicle distance is narrowed, and the vehicle speed of each ordinary vehicle 200 decreases by about 10 km/h. In this case, as shown in the broken-line portion of the drawing, since a vehicle which is reluctant to decrease in vehicle speed makes a lane change to the passing lane, and a decrease in the inter-vehicle distance on the passing lane side becomes prominent.

As shown in FIG. 7(*b*), an ordinary vehicle 200 which decreases in speed on the uphill after the sag 520 without a driver being aware leads to congestion. Alternatively, unnatural cutting-in of a truck or the like leads to congestion. As shown in FIG. 7(*c*), if the inter-vehicle distance is narrowed due to a decrease in the speed of a preceding ordinary vehicle 200, a succeeding ordinary vehicle 200 decreases speed so as to maintain the inter-vehicle distance from the preceding vehicle. In this case, since the succeeding vehicle needs to decrease speed to a speed lower than the preceding vehicle, speed decrease propagation occurs in which a decrease in speed is amplified and propagate from the preceding vehicle to the succeeding vehicle, resulting in congestion.

As shown in FIG. 7(*d*), even after the sag 520 leading to congestion has been passed, the inter-vehicle distance between the ordinary vehicles 200 is narrowed and speed is difficult to increase. Accordingly, the recovery of speed after speed decrease is delayed and congestion is continued.

As a method of preventing congestion, the following method is considered:

(1) a method which detects or predicts a decrease in the speed of the host vehicle and gives notification through a warning;

(2) a method which ascertains a surrounding traffic situation through vehicle-to-vehicle communication and issues an instruction for a necessary acceleration and deceleration to a driver or automatically controls the acceleration and deceleration;

(3) a method which detects a vehicle having decreased in vehicle speed through road-side infrastructure and gives notification through a warning; and (4) a method which makes it easy to recognize a gradient by devising a road structure (for example, allows a road slope to be recognized by a horizontal line of a road-side wall).

However, the above-described methods (1) and (2) have no effects if a system is not mounted in a vehicle decreasing in vehicle speed which is a cause of congestion. The above-described methods (1) and (3) have no effects because speed decrease propagation has already been started even when a warning is given after speed decrease has been detected. Even when notification through a warning is given, the driver may not take any action. The above-described methods (3) and (4) have no effects when an infrastructure is not provided at a position where a vehicle decreasing in vehicle speed travels. The above-described method (4) does not allow the driver to directly recognize a decrease in speed, such that it may be difficult to expect the effect that the driver recovers speed.

When traffic flow is concentrated on a single road, only a few vehicles decreasing in vehicle speed lead to congestion. For this reason, in the above-described method which takes action for only the vehicles decreasing in vehicle speed described above, if a system is not mounted in all the vehicles, it may be difficult to expect effects. As a result, with regard to the action to be taken on the road side, if the countermeasures are not recognized by the drivers of all the vehicles, it may be difficult to expect effects. Accordingly, in this embodiment, the following operation is performed to prevent congestion.

(Operation to Prompt Increase in Speed with Appropriate Inter-Vehicle Distance)

Figure 2:
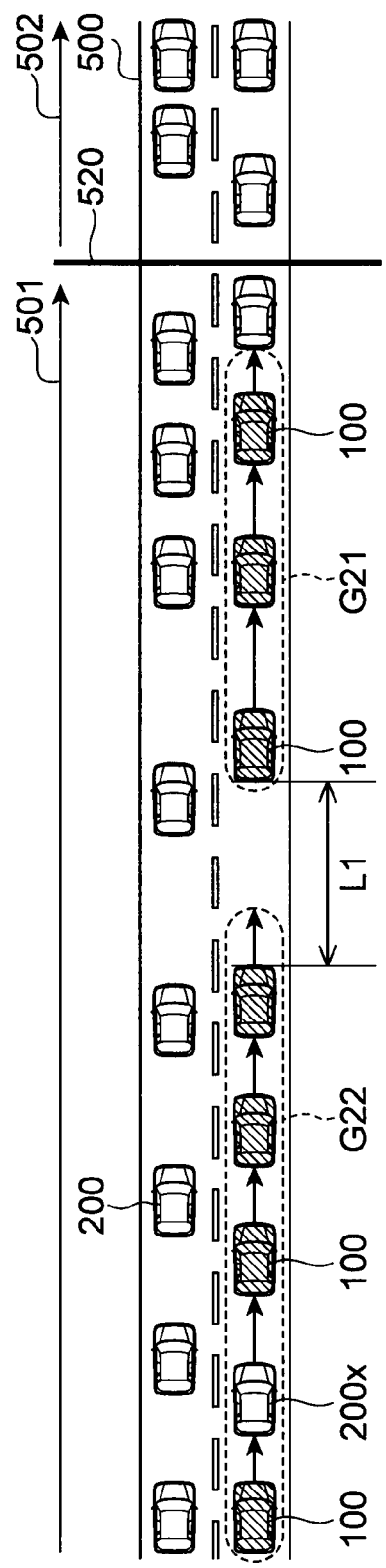
FIG. 2 is a plan view showing an operation to prompt an increase in speed with an appropriate inter-vehicle distance.

Hereinafter, the operation of the vehicle control device 10a of this embodiment will be described. First, an operation to prompt an increase in speed of an ordinary vehicle with an appropriate inter-vehicle distance will be described. As shown in FIG. 2, it is assumed that system-mounted vehicles 100 in which the vehicle control device 10a of this embodiment is mounted and ordinary vehicles 200 are mixedly traveling on a road 500. The road 500 has a sag 520 between a downhill 501 and an uphill 502. Around the sag 520 is a point where a decrease in the vehicle speed of the ordinary vehicles 200 is induced frequently. A vehicle group G21 which approaches the sag 520 includes only the system-mounted vehicles 100. A vehicle group G22 succeeding the vehicle group G21 includes an ordinary vehicle 200x in addition to the system-mounted vehicles 100.

Each of the system-mounted vehicles 100 included in the vehicle group G21 detects the relative position of the host vehicle with respect to the sag 520 where a decrease in vehicle speed is induced in front of the host vehicle. Each of the system-mounted vehicles 100 included in the vehicle group G21 travels in the vehicle group G21 with a long inter-vehicle distance until approaching the sag 520.

When the host vehicle has reached a predetermined distance (for example, 20 to 200 m) before the sag 520 or when a predetermined time (for example, 1 to 20 seconds) has come before the host vehicle reaches the sag 520, each of the system-mounted vehicles 100 included in the vehicle group G21 travels in the vehicle group G21 with a short inter-vehicle distance and starts to increase speed such that the inter-vehicle distance from the ordinary vehicle 200x behind the host vehicle increases. As a result, an inter-vehicle distance L1 is formed between the vehicle group G21 and the vehicle group G22.

When the host vehicle has reached a predetermined distance before the sag 520 or when a predetermined time has come before the host vehicle reaches the sag 520, each of the system-mounted vehicles 100 included in the vehicle group G22 starts to increase speed such that the inter-vehicle distance from the ordinary vehicle 200x behind the host vehicle increases. When the inter-vehicle distance from the system-mounted vehicle 100 as a preceding vehicle is extended, the driver of the ordinary vehicle 200x in the vehicle group G22 is prompted to increase speed, and the ordinary vehicle 200x naturally starts to increase speed. As a result, the ordinary vehicle 200x passes through the sag 520 at a speed after speed increase, and a decrease in speed around the sag 520 is avoided, thereby preventing the occurrence of congestion due to a decrease in speed around the sag 520.

As described above, since the ordinary vehicle 200x which is prompted to increase speed with an appropriate inter-vehicle distance in front is generally a vehicle being decreased in vehicle speed which is present in a certain percentage from among the ordinary vehicles 200, it is not necessary to detect the traveling states of the ordinary vehicles 200 and to select one from among the ordinary vehicles 200. However, the traveling state of another vehicle around the host vehicle is detected by the radar 32 or the like of the vehicle control device 10a, and a vehicle which tends to be most decreased in vehicle speed from among other vehicles around the host vehicle may be regarded as the ordinary vehicle 200x which is prompted to increase speed in the above-described manner.

(Operation to Give Illusion of being Slower than Flow of Road Traffic and to Prompt Increase in Speed)

Figure 3:
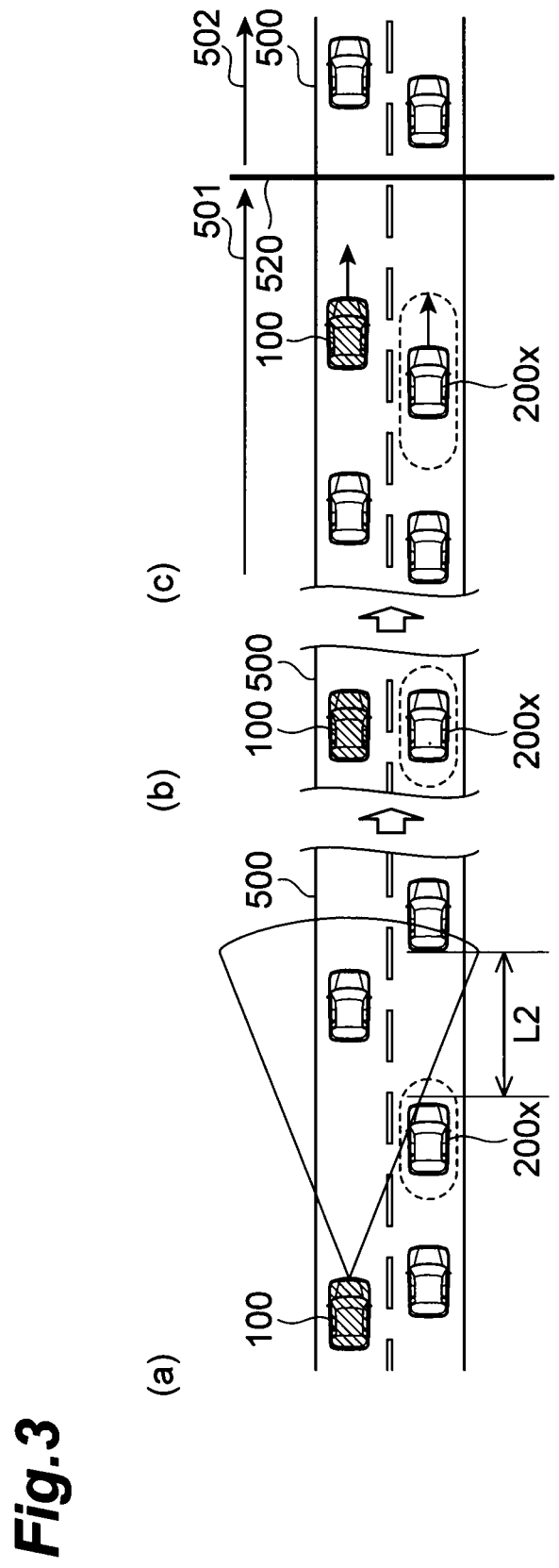
FIGS. 3(a) to 3(c) are plan views showing an operation to prompt an increase in speed by giving an illusion of being slower than the flow.

Hereinafter, an operation to give an illusion of being slower than the flow of road traffic to the driver of each ordinary vehicle 200 and to prompt the driver to increase speed will be described. As shown in FIG. 3(a), the radar 32 of the vehicle control device 10a of each system-mounted vehicle 100 scans the ordinary vehicles 200 which are traveling on the road 500, and detects the relative position and relative speed of each ordinary vehicle 200. The ECU 20 estimates the ordinary vehicle 200x which is likely to decrease in vehicle speed from the detection result of the radar 32. For example, the ECU 20 can estimate the ordinary vehicle 200x under the condition that the inter-vehicle distance L2 in front is equal to or greater than a predetermined threshold value (10 to 50 m) or that the inter-vehicle distance in front increases as the ordinary vehicle 200x which is likely to decrease in speed.

As shown in FIG. 3(b), the system-mounted vehicle 100 travels in parallel with the ordinary vehicle 200x estimated as a vehicle which is likely to decrease in speed. As shown in FIG. 3(c), the system-mounted vehicle 100 travels in parallel with the ordinary vehicle 200x until the host vehicle has reached a predetermined distance (for example, 20 to 200 m) before the sag 520 or until a predetermined time (for example, 1 to 20 seconds) before the host vehicle reaches the sag 520 while confirming the relative position of the host vehicle with respect to the sag 520 by the navigation system 16, and thereafter, gradually increases speed (0.01 G to 0.1 G).

The driver of the ordinary vehicle 200x is given an illusion of being slower than the flow of traffic by a gradual increase in speed of the system-mounted vehicle 100 and is prompted to increase speed, and the ordinary vehicle 200x starts to increase speed. At this time, since the ordinary vehicle 200x is located in the downhill 501, it is easy to increase speed. As a result, the ordinary vehicle 200x passes through the sag 520 at a speed after speed increase, and a decrease in speed around the sag 520 is avoided, thereby preventing the occurrence of congestion due to a decrease in speed around the sag 520.

(Operation to Prevent Further Decrease in Speed Due to Cutting-In of Vehicle Having Decreased in Vehicle Speed)

Figure 4:
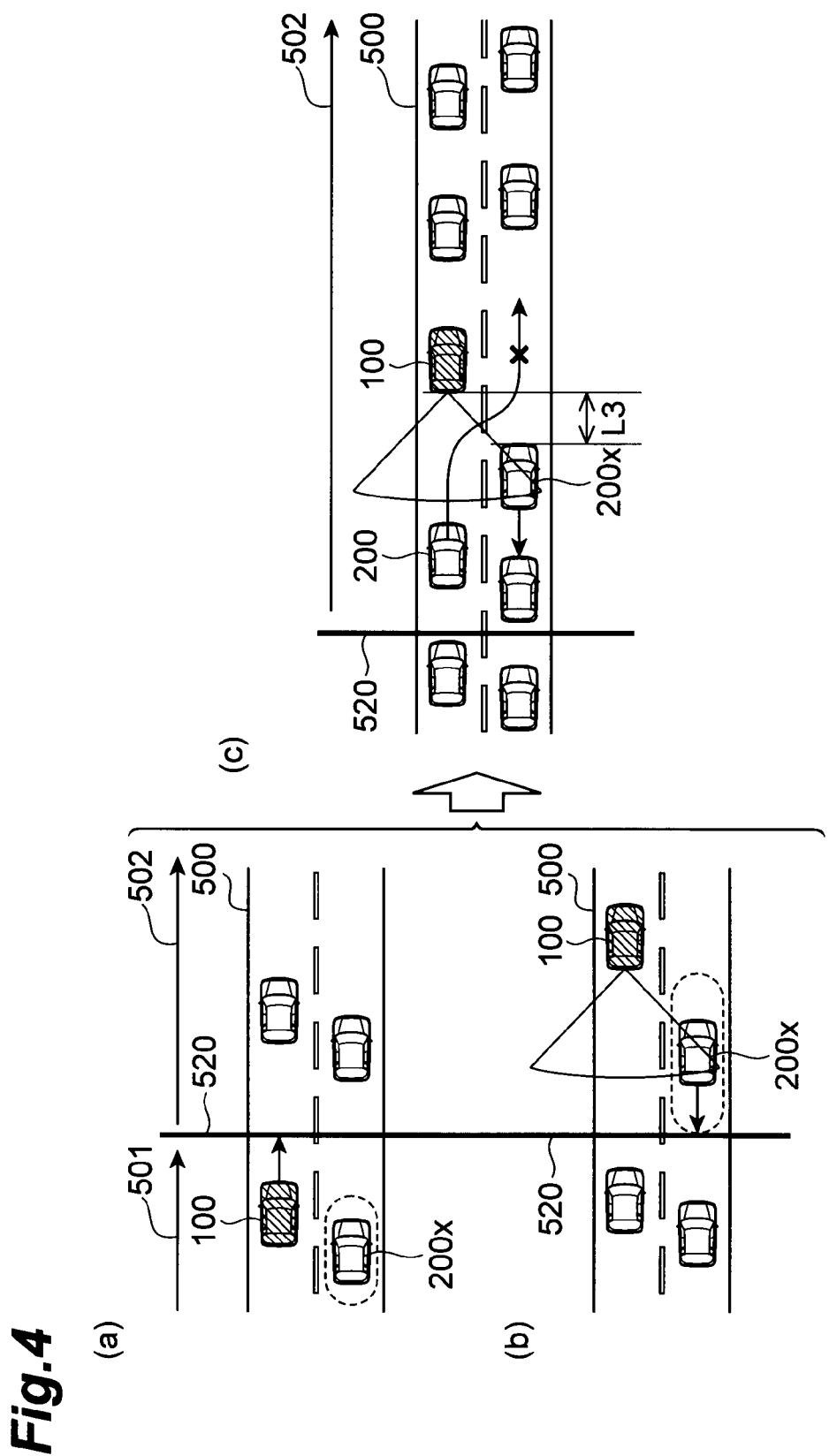
FIGS. 4(a) to 4(c) are plan views showing an operation to suppress a further decrease in the speed of a vehicle decreasing in vehicle speed due to cutting-in in front of the vehicle decreasing in vehicle speed.

Hereinafter, an operation to prevent a further decrease in speed of the ordinary vehicle 200x having decreased in vehicle speed due to the cutting-in of another vehicle 200 having decreased in vehicle speed will be described. As shown in FIG. 4(a), it is assumed that, during the operation to prompt an increase in speed after parallel traveling described above, the system-mounted vehicle 100 and the ordinary vehicle 200x estimated as a vehicle which is likely to decrease in speed pass through the sag 520.

As shown in FIG. 4(b), it is assumed that the radar 32 of the system-mounted vehicle 100 has detected that the ordinary vehicle 200x has started to decrease speed immediately after having passed through the sag 520. In this case, as shown in FIG. 4(c), the system-mounted vehicle 100 travels in front of the ordinary vehicle 200x in a lane adjacent to the ordinary vehicle 200x with an inter-vehicle distance L3. It is assumed that the inter-vehicle distance L3 is equal to or smaller than the whole length (4 to 6 m) of an ordinary vehicle, and is an inter-vehicle distance such that it is possible to prevent cutting in front of the ordinary vehicle 200x.

As a result, it becomes possible to effectively prevent a further decrease in speed of the ordinary vehicle 200x due to cutting in front and the occurrence of congestion around the sag 520. Since many drivers, who are apt to decrease vehicle speed, are unaccustomed to the driving of a beginner or an old person, when affected by disturbance, such as cutting-in, vehicle speed is apt to to further decrease. However, with the above-described operation, it is possible to prevent a decrease in vehicle speed.

In this embodiment, the navigation system 16 acquires information relating to a point, such as the sag 520, where a decrease in vehicle speed is induced in front of the system-mounted vehicle 100. When the system-mounted vehicle 100 has reached a predetermined distance before the sag 520 concerning the information acquired by the navigation system 16 or when a predetermined time has come before reaching the sag 520, the ECU 20 and the ACC 30 control the traveling of the system-mounted vehicle 100 such that the inter-vehicle distance from the ordinary vehicle 200 behind the system-mounted vehicle 100 increases. Therefore, even when the vehicle control device 10a of the invention is not mounted in the ordinary vehicle 200x behind the system-mounted vehicle 100, the inter-vehicle distance increases, thereby preventing a decrease in the speed of the ordinary vehicle 200x behind the system-mounted vehicle 100 and more effectively suppressing congestion.

That is, according to this embodiment, the ordinary vehicle 200x in which the vehicle control device 10a is not mounted is controlled by the movement of the system-mounted vehicle 100, thereby preventing the occurrence of a vehicle being decreased in vehicle speed. In particular, even when the market penetration of the system-mounted vehicle 100 is low at the initial stage of the commercialization of the vehicle control device 10a, this embodiment can achieve the effect of preventing congestion.

According to this embodiment, the ECU 20 and the ACC 30 control the traveling of the system-mounted vehicle 100 such that the system-mounted vehicle 100 travels in parallel with the ordinary vehicle 200x until the ordinary vehicle 200x which is more likely to decrease in vehicle speed approaches the sag 520 or the like. Therefore, the driver of the ordinary vehicle 200x which is likely to decrease in vehicle speed is given the illusion of its vehicle speed being low to prevent a decrease in the vehicle speed of the ordinary vehicle 200x, thereby efficiently suppressing the occurrence of congestion due to a decrease in the speed of the ordinary vehicle 200x.

According to this embodiment, when it is detected that the ordinary vehicle 200x which is more likely to decrease in vehicle speed has decreased in speed within a predetermined range from the sag 520, the ECU 20 and the ACC 30 control the traveling of the system-mounted vehicle 100 such that the system-mounted vehicle 100 travels through a position where the ordinary vehicle 200 can be prevented from cutting in front of the ordinary vehicle 200x. Therefore, it is possible to prevent a further decrease in the vehicle speed of the ordinary vehicle 200x having decreased in speed at the sag 520 due to the cutting-in of the ordinary vehicle 200 in front, thereby more efficiently suppressing the occurrence of congestion due to a decrease in the vehicle speed of the ordinary vehicle 200x.

Figure 5:
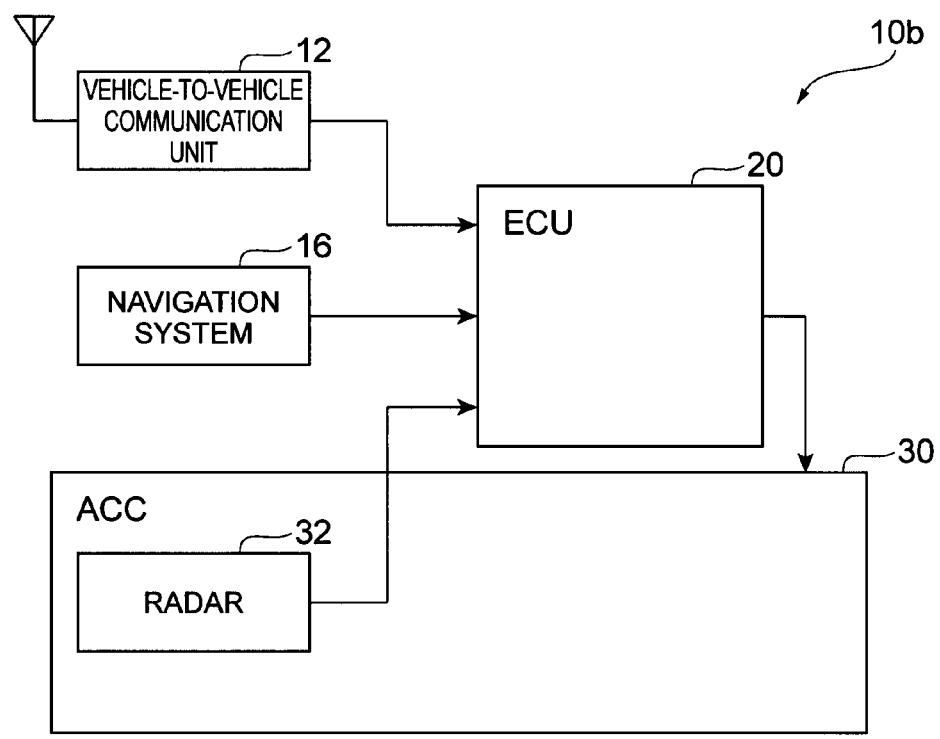
FIG. 5 is a block diagram showing the configuration of a traveling control device according to a second embodiment.

Hereinafter, a second embodiment of the invention will be described. As shown in FIG. 5, a vehicle control device 10b of this embodiment is different from the above-described first embodiment in that a vehicle-to-vehicle communication unit 12 is connected to the ECU 20. The vehicle-to-vehicle communication unit 12 transmits and receives information mutually regarding the position and speed of the system-mounted vehicle 100 other than the host vehicle or whether vehicle control for preventing congestion is ON or OFF through vehicle-to-vehicle communication.

(Operation to Prompt Increase in Speed with Appropriate Inter-Vehicle Distance)

Figure 6:
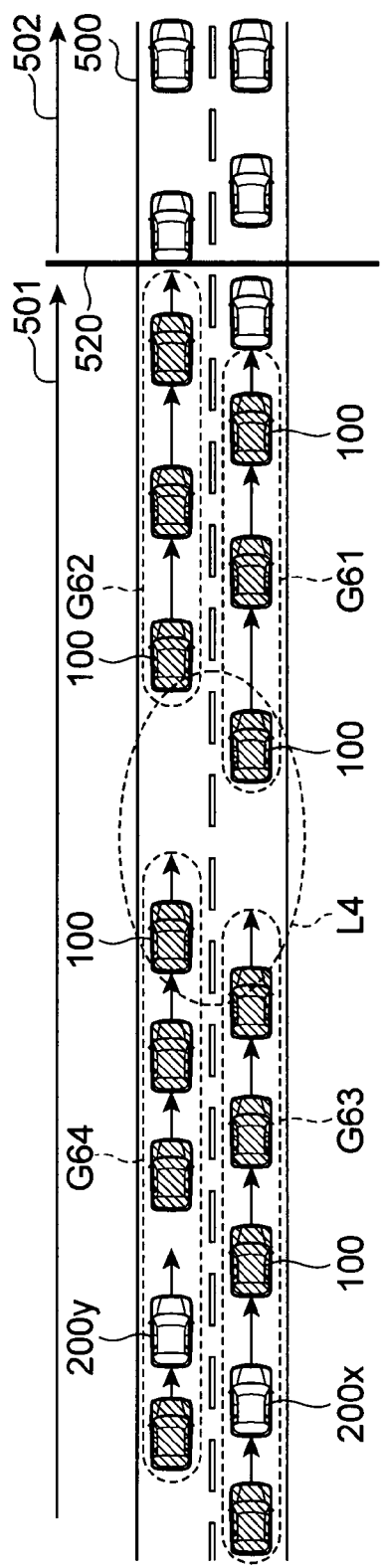
FIG. 6 is a plan view showing an operation to prompt an increase in speed with an appropriate inter-vehicle distance.

Hereinafter, an operation to prompt an increase in speed with an appropriate inter-vehicle distance in the vehicle control device 10b of this embodiment will be described. As shown in FIG. 6, it is assumed that system-mounted vehicles 100 in which the vehicle control device 10b of this embodiment is mounted and ordinary vehicles 200x and 200y are mixedly traveling on a road 500. The road 500 has a sag 520 between a downhill 501 and an uphill 502. A vehicle group G61 which approaches the sag 520 and a vehicle group G62 which travels in a lane adjacent to the vehicle group G61 include only the system-mounted vehicles 100. Vehicle groups G63 and G64 respectively succeeding the vehicle groups G61 and G62 include the ordinary vehicles 200x and 200y in addition to the system-mounted vehicles 100.

As in the above-described first embodiment, each of the system-mounted vehicles 100 included in the vehicle groups G61 and G62 detects the relative position of the host vehicle with respect to the sag 520. The system-mounted vehicles 100 included in the vehicle groups G61 and G62 travel in the vehicle groups G61 and G62 with a long inter-vehicle distance until approaching the sag 520.

When the host vehicle has reached a position at a predetermined distance (for example, 20 to 200 m) before the sag 520 or when a predetermined time (for example, 1 to 20 seconds) has come before the host vehicle reaches the sag 520, the system-mounted vehicles 100 included in the vehicle groups G61 and G62 travels in the vehicle groups G61 and G62 with a short inter-vehicle distance in synchronization with each other (simultaneously) while performing vehicle-to-vehicle communication by the vehicle-to-vehicle communication unit 12, and simultaneously starts to increase speed such that the inter-vehicle distance from each of the ordinary vehicles 200x and 200y behind the host vehicle increases. In this case, the position, speed, or the like the system-mounted vehicles 100 included in the vehicle groups G61 and G62 in the traveling direction of the road may be identical. As a result, an inter-vehicle distance L4 is simultaneously formed between the vehicle group G61 and the vehicle group G63 and between the vehicle group G62 and the vehicle group G64.

When the host vehicle has reached a position at a predetermined distance before the sag 520 or when a predetermined time has come before the host vehicle reaches the sag 520, the system-mounted vehicles 100 included in the vehicle groups G63 and G64 start to increase speed in synchronization with each other such that the inter-vehicle distance from the ordinary vehicle 200x behind the host vehicle increases. When the inter-vehicle distance from the system-mounted vehicle 100 as a preceding vehicle is extended, the drivers of the ordinary vehicles 200x and 200y in the vehicle groups G63 and G64 are prompted for an operation to increase speed, and the ordinary vehicles 200x and 200y naturally start to increase speed. As a result, the ordinary vehicles 200x and 200y pass through the sag 520 at a speed after speed increase, and a decrease in speed around the sag 520 is avoided, thereby preventing the occurrence of congestion due to a decrease in speed around the sag 520.

In this embodiment, since the system-mounted vehicles 100 which travel in a traveling lane and a passing lane adjacent to each other are allowed to perform the same operation synchronously, and the inter-vehicle distance L4 is given simultaneously in both lanes, the drivers of the ordinary vehicles 200x and 200y traveling in the respective lanes do not mind a lane change. If cutting-in from an adjacent lane occurs, an increase in the speed of a succeeding vehicle is blocked; however, in this embodiment, the drivers of the ordinary vehicles 200x and 200y traveling the respective lanes do not mind a lane change, thereby preventing cutting-in and preventing a decrease in vehicle speed in each lane.

Although the embodiments of the invention have been described, the invention is not limited to the above-described embodiments and various modifications may be made. For example, although in the above-described embodiments, description has been provided focusing on a form in which the vehicle control device mounted in each system-mounted vehicle performs vehicle control for preventing congestion, for example, a vehicle control device may be arranged only in a management center, and a command from the management center may be transmitted to each vehicle through communication to perform vehicle control for preventing congestion.

INDUSTRIAL APPLICABILITY

According to the invention, even when the market penetration of a system-mounted vehicle in which the vehicle control device of the invention is mounted is not high, it becomes possible to more effectively suppress congestion.

REFERENCE SIGNS LIST 10a, 10b: vehicle control device
12: vehicle-to-vehicle communication unit
16: navigation system
20: ECU
30: ACC
32: radar
100: system-mounted vehicle
200, 200x, 200y: ordinary vehicle
500: road
501: downhill
502: uphill
520: sag
600: optical beacon communication unit

The invention claimed is:

1. A vehicle control device comprising:
information acquisition circuitry that acquires information relating to a vehicle speed decreasing point where a decrease in vehicle speed is induced in front of a host vehicle; and
traveling control circuitry that, when at least one of the host vehicle has reached a predetermined distance before the vehicle speed decreasing point concerning the information acquired by the information acquisition circuitry and when a predetermined time has come before the host vehicle reaches the vehicle speed decreasing point concerning the information acquired by the information acquisition circuitry, controls the traveling of the host vehicle such that the inter-vehicle distance from another vehicle behind the host vehicle increases;
wherein the traveling control circuitry
identifies another vehicle having a vehicle speed decrease tendency for which the possibility of a decrease in vehicle speed is equal to or greater than a predetermined threshold value, and
at least one of (i) when the another vehicle having the vehicle speed decrease tendency has reached a predetermined distance before the vehicle speed decreasing point and (ii) when a predetermined time has come before the host vehicle reaches the vehicle speed decreasing point, controls the traveling of the host vehicle such that the host vehicle travels in parallel with the vehicle having the vehicle speed decrease tendency.

2. The vehicle control device according to claim 1, wherein the traveling control circuitry controls the traveling of the host vehicle such that the inter-vehicle distance from the another vehicle behind the host vehicle increases in synchronization with the traveling of another vehicle which travels in a lane adjacent to the lane in which the host vehicle travels such that the inter-vehicle distance from a further vehicle behind another vehicle increases.

3. The vehicle control device according to claim 1, wherein, when it is detected that the another vehicle having the vehicle speed decrease tendency has decreased in speed within the predetermined distance from the vehicle speed decreasing point, the traveling control unit circuitry controls the traveling of the host vehicle such that the host vehicle travels through a position where another vehicle can be prevented from cutting in front of the another vehicle having the vehicle speed decrease tendency.

4. A vehicle control method comprising:
acquiring using electronic control circuitry information relating to a vehicle speed decreasing point where a decrease in vehicle speed is induced in front of a host vehicle; and
at least one of when the host vehicle has reached a predetermined distance before the decreasing point concerning the information acquired in the step of acquiring the information and when a predetermined time has come before the host vehicle reaches the vehicle speed decreasing point concerning the information acquired in the step of acquiring the information, controlling with the electronic control circuitry the traveling of the host vehicle such that the inter-vehicle distance from another vehicle behind the host vehicle increases
wherein the controlling of the traveling of the host vehicle includes,
identifying another vehicle having a vehicle speed decrease tendency for which the possibility of a decrease in vehicle speed is equal to or greater than a predetermined threshold value, and
at least one of (i) when the another vehicle having the vehicle speed decrease tendency has reached a predetermined distance before the vehicle speed decreasing point and (ii) when a predetermined time has come before the host vehicle reaches the vehicle speed decreasing point, controlling the traveling of the host vehicle such that the host vehicle travels in parallel with the vehicle having the vehicle speed decrease tendency.

5. The vehicle control method according to claim 4, wherein, in the step of controlling the traveling of the host vehicle, the traveling of the host vehicle is controlled such that the inter-vehicle distance from the another vehicle behind the host vehicle increases in synchronization with the traveling of another vehicle which travels in a lane adjacent to the lane in which the host vehicle travels such that the inter-vehicle distance from a further vehicle behind another vehicle increases.

6. The vehicle control method according to claim 4, wherein, in the step of controlling the traveling of the host vehicle, when it is detected that the another vehicle having the vehicle speed decrease tendency has decreased in speed within the predetermined distance from the vehicle speed decreasing point, the traveling of the host vehicle is controlled such that the host vehicle travels through a position where another vehicle can be prevented from cutting in front of the another vehicle having a vehicle speed decrease tendency.

7. A vehicle control system comprising:
information acquisition unit that acquires information relating to a vehicle speed decreasing point where a decrease in vehicle speed is induced; and
traveling control unit that, when at least one of one vehicle has reached a predetermined distance before the vehicle speed decreasing point concerning the information acquired by the information acquisition unit and when a predetermined time has come before the one vehicle reaches the vehicle speed decreasing point concerning the information acquired by the information acquisition unit, controls the traveling of the one vehicle such that the inter-vehicle distance from another vehicle behind the one vehicle increases;
wherein the traveling control unit
identifies another vehicle having a vehicle speed decrease tendency for which the possibility of a decrease in vehicle speed is equal to or greater than a predetermined threshold value, and
at least one of (i) when the another vehicle having the vehicle speed decrease tendency has reached a predetermined distance before the vehicle speed decreasing point and (ii) when a predetermined time has come before the one vehicle reaches the vehicle speed decreasing point, controls the traveling of the one vehicle such that the one vehicle travels in parallel with the vehicle having the vehicle speed decrease tendency.

8. The vehicle control system according to claim 7, wherein the traveling control unit controls the traveling of the one vehicle such that the inter-vehicle distance from the another vehicle behind the one vehicle increases in synchronization with the traveling of another vehicle which travels in a line adjacent to the lane in which the one vehicle travels such that the inter-vehicle distance from a further vehicle behind another vehicle increases.

9. The vehicle control system according to claim 8, wherein, when it is detected that the another vehicle having the vehicle speed decrease tendency has decreased in speed within the predetermined distance from the vehicle speed decreasing point, the traveling control unit controls the traveling of the one vehicle such that the one vehicle travels through a position where another vehicle can be prevented from cutting in front of the another vehicle having a vehicle speed decrease tendency.

* * * * *